United States Patent [19]

Fresnel et al.

[11] 4,090,927

[45] May 23, 1978

[54] PROCESS FOR ELECTRO-DEPOSITING A METAL ON CONDUCTING GRANULES

[75] Inventors: Jean-Marie Fresnel, Haut-Thoiry, France; Antonin Kulhanek, Le Lignon; Augusto Porta, Geneva, both of Switzerland

[73] Assignee: Battelle Memorial Institute, Switzerland

[21] Appl. No.: 767,312

[22] Filed: Feb. 10, 1977

[30] Foreign Application Priority Data

Feb. 12, 1976 Switzerland .................. 1686/76

[51] Int. Cl.² .............. C25C 1/00; C25C 5/02; C25C 7/00
[52] U.S. Cl. .................................. 204/10; 204/23; 204/201; 204/275
[58] Field of Search ............. 204/201, 222, 223, 275, 204/10, 23

[56] References Cited

U.S. PATENT DOCUMENTS

| 521,991 | 6/1894 | Sachs et al. | 204/23 |
| 1,466,582 | 8/1923 | Dietzel | 204/201 |
| 3,420,766 | 2/1969 | Michelson | 204/201 |
| 3,425,926 | 2/1969 | Hojyo | 204/201 |

FOREIGN PATENT DOCUMENTS

| 38-6359 | 5/1963 | Japan | 204/201 |

Primary Examiner—T. M. Tufariello
Attorney, Agent, or Firm—Robert E. Burns; Emmanuel J. Lobato; Bruce L. Adams

[57] ABSTRACT

Metal is electrodeposited on conductive granules in apparatus comprising a helical channel with a cathode at its radially outer side and an anode at its radially inner side. A suspension of the granules in an electrolysis solution is fed tangentially into an end of the channel so that the granules are urged by centrifugal force against the cathode and form a mass moving along the channel to its outlet. The emerging granules are separated from the used solution in a cyclone and the solution is recirculated along the axis of the helix.

6 Claims, 2 Drawing Figures

PROCESS FOR ELECTRO-DEPOSITING A METAL ON CONDUCTING GRANULES

This invention relates to the electrolytic production of metals, and in particular to electrolysis processes and equipment designed in particular for the industrial production of zinc, copper, nickel and cobalt.

Electrolysis installations used at present for the industrial production of zinc and copper comprise a large number of cells with large area flat electrodes (1 to 2 $m^2$ or more).

During recent years, certain improvements have been effected enabling the running costs of such installations to be considerably reduced and the quality of the copper and zinc obtained by electrolysis to be improved.

However it has become necessary to give consideration to new aspects which have arisen in the metal extraction field, namely:
the tendency to work increasingly poor minerals, leading to the need to carry out prior concentration of the solution to be subjected to electrolysis;
anti-pollution measures taken in various countries.

An important problem arising from the veto on the disposal of gaseous or liquid effluents containing more than negligible quantities of harmful products is the need to treat such effluents, and this requires special measures which at the present time are very complicated and costly.

Thus in currently used electrolysis cells, the release of acid mist poses a problem which cannot be ignored. To take account of this, recourse is often had to measures intended to limit the disadvantages deriving from such release, by using for example surface-active agents which are mixed with the electrolyte. However such measures represent only a partial solution to said problem and they are also very costly.

Moreover, cost optimisation calculations have shown that the current density should be greater than that used in present electrolysis installations to attain the optimum value corresponding to minimum investment and operating costs.

Although data is available concerning the operation of currently used electrolysis cells under different electrical conditions, it is nevertheless difficult to forecast if the properties of the electrolytic deposit obtained on an industrial scale will be affected by any change in these conditions, so that additional product quality problems can arise in this case.

Consequently, there would be a certain practical interest in being able to increase the current density per unit of apparent surface area of the electrodes with a view to increasing productivity, i.e. the quantity of metal produced per unit volume of the electrolytic installation, without the metal quality being affected thereby.

It would also be attractive to reduce the distance between the electrodes (cathode-anode) which at present is about 3 to 5 cm, so as to reduce the ohmic drop in order to limit energy consumption per unit of weight of the metal produced by electrolysis.

Moreover it would be desirable to reduce the overvoltage on the electrodes as much as possible, in particular by improving mass transfer, in order to limit the energy consumption per unit of weight of the metal deposited by electrolysis.

Furthermore, it is evidently very desirable to automate the operation of an industrial electrolysis installation so as to reduce as much as possible both down-times and the costs arising from manual operation. The electrolysis installations currently in use require a stripping operation on the deposited metal, involving costs and a down-time which cannot be ignored in most cases.

In spite of the considerable improvements made in recent year to electrolysis installations, it has not been possible to satisfactorily take account of all the aforegoing problems.

The object of the present invention is to enable the electrolysis to be effected in such a manner as to take as much account as possible of all the aforementioned technical and economical problems and limitations.

To this end, it is proposed to obviate certain limitations of conventional fixed flat electrode electrolysis cells by using a particular electrode form known as "three-dimensional" comprising a divided conducting mass which is placed in contact with a fixed current collector.

The following are particular examples of the various known types of three-dimensional electrodes:
(a) fixed porous electrode through which the electrolyte passes under pressure;
(b) electrode in the form of a fixed bed of conducting particles deposited freely or compressed into a given volume, the fixed bed being traversed by the electrolyte under pressure;
(c) electrode in the form of a fluidised bed of conducting particles suspended freely in an ascending current of electrolyte;
(d) "dispersed and agitated" electrode, comprising a mass of conducting particles dispersed in the electrolyte which is mechanically agitated to favour contact with the corresponding current collector;
(e) dispersed "slurry" electrode comprising conducting particles suspended in the electrolyte and entrained by this latter to bring them into contact with the corresponding current collector.

Such electrodes notably have in principle the advantage of a considerably increased surface per given volume, leading to the possibility of effecting good mass transfer, but the aforesaid types of electrodes also have certain limitations.

Thus the fixed electrodes of type (a) and (b) require very precise control of the electrolyte flow and in particular run the risk of progressive clogging, making it impossible to work continuously under uniform conditions.

In addition, the fluidised bed, mechanically agitated or slurry electrodes of type (c), (d) and (e) only allow a relatively limited time of contact between each particle and the collector by the sporadic collisions on this latter, compared with the much longer time during which the particles are in suspension in the electrolyte, i.e. out of contact with the electrolyte collector.

Thus, while the particles are in suspension and not participating in the electrolysis, they can dissolve in the electrolyte, as is the case with zinc in particular. Such electrodes consequently generally require a diaphragm in order to prevent contact between the suspended particles and the counter-electrode, this diaphragm itself giving rise to a not negligible ohmic drop.

In spite of the considerable advantages of three-dimensional electrodes, they have not found much application in the field of industrial electrolysis because of the aforesaid limitations.

The object of the present invention is therefore to allow electro-deposition of metals under the advantageous condition of a considerable increase in the surface available for electrolysis, while at the same time obviating the aforesaid disadvantages and limitations as far as possible.

To this end, the present invention provides a process for electro-depositing a metal on conducting granules formed in particular from the same metal, and having a predetermined average size, characterised in that:

(a) said granules are placed in suspension in an electrolytic solution containing the dissolved metal to be deposited;

(b) this suspension is introduced tangentially into an inlet end of a closed helical channel wound about an axis of rotation and provided with two current collectors disposed coaxially at a predetermined radial distance apart and facing each other so that they longitudinally define two opposing sides of the helical channel;

(c) the two collectors are connected to the terminals of a current source such that the collector situated on the side closest to said axis of rotation is connected to the positive terminal of the source to constitute an anodic collector, and the collector situated on the side farthest from this axis is connected to the negative terminal to constitute a cathodic collector with an internal surface designed to contact said granules;

(d) the average size of said granules, the average winding radius, the dimensions of said helical channel and the speed of introduction of said suspension into the channel are chosen as a function of each other and of the properties of said solution such as to create at said inlet a rotating movement capable of producing a centrifugal force sufficient to energetically propel said granules against said cathodic surface so as to bring them vary rapidly into contact with said surface to cover it with a mobile layer formed from said granules, which are entrained along said surface and kept in contact with the surface by the mass of said solution which circulates through said channel between said inlet and an outlet disposed at its opposite end;

(e) an electric current is passed between said collectors to effect electrolysis while said solution circulates between the inlet and outlet of the helical channel, such that said dissolved metal becomes precipitated on the granules which are kept in contact with said cathodic surface to form said mobile layer, and the granules thus progressively enlarge during their entrainment along said surface; and (f) the solution is separated from the enlarged granules leaving the helical channel so as to remove them separately from each other.

The invention also relates to an electrolysis apparatus for electro-depositing a metal on conducting granules by effecting the process according to the invention.

This apparatus in a preferred form is characterised by:

(a) at least one closed annular helical channel constituting an electrolysis enclosure defined by a cathodic collector disposed coaxially about a tubular anodic collector and separated from this latter by an electrically insulating helical distance piece;

(b) a tangential inlet disposed at one end of said helical channel and intended for the introduction of said suspension, giving it a rotating movement capable of subjecting said granules to a centrifugal force sufficient to energetically propel them outwards in such a manner that they form a mobile layer which moves along the surface of the cathodic collector as far as the outlet of the helical channel situated at the opposite end of said channel;

(c) a centrifugal separation device provided with an inlet connected to said outlet of the helical channel, and two axial outlets of which a first outlet is connected to the interior of the tubular anodic collector to enable the solution separated by said device to be withdrawn, and of which the second outlet serves for removing the granules coated with the deposited metal; and (d) narrow transverse apertures provided in said tubular anodic collector to constitute degassing passages connecting the helical channel, at various points distributed over its length, to the interior of the anodic collector.

Thus the present invention consists essentially in effecting electrolysis to precipitate a metal on granules of the same metal in the following manner:

the metal granules are given a rapid rotational movement by means of an electrolyte solution containing the dissolved metal to be deposited, by making this solution circulate in a helical channel wound about an axis of rotation, this axis being preferably vertical;

current collectors for effecting the electrolysis are disposed so that they are situated coaxially facing each other and define the opposing sides of said helical channel, the anodic collector being situated on the side closest to the axis of rotation and the cathodic collector being situated on the farthest side so that it makes contact with the granules under the action of the centrifugal force due to said rotational movement in the helical channel;

the granule size, the dimensions of said channel, the winding radius of the channel about the axis of rotation, and the speed of circulation of the electrolytic solution in the channel are chosen as a function of each other and of the properties of said solution, such that said rotating movement produces a centrifugal force sufficient to energetically propel the majority of granules outwards against the cathodic surface, the granules thus being brought very rapidly into contact with this surface by separating from the mass of solution circulating through said helical path, the granules covering the cathodic surface while at the same time they are entrained along this surface and in contact therewith by said circulation of the solution during the electrolysis, thus enabling the metal to be precipitated on to granules which progressively enlarge until they reach the outlet of the helical channel where they are removed;

the electrolysis solution and granules which have become enlarged are then removed at the outlet of the helical channel preferably by a hydrocyclone enabling them to be separated and to be removed separately from each other, the solution being then able to be recycled to the inlet of the helical channel to undergo repeated electrolysis, and likewise a selected part of the removed granules can be recycled to undergo further enlargement.

The invention is explained hereinafter in greater detail with reference to the accompanying drawing which represents one embodiment of the invention by way of example.

Figure 1:
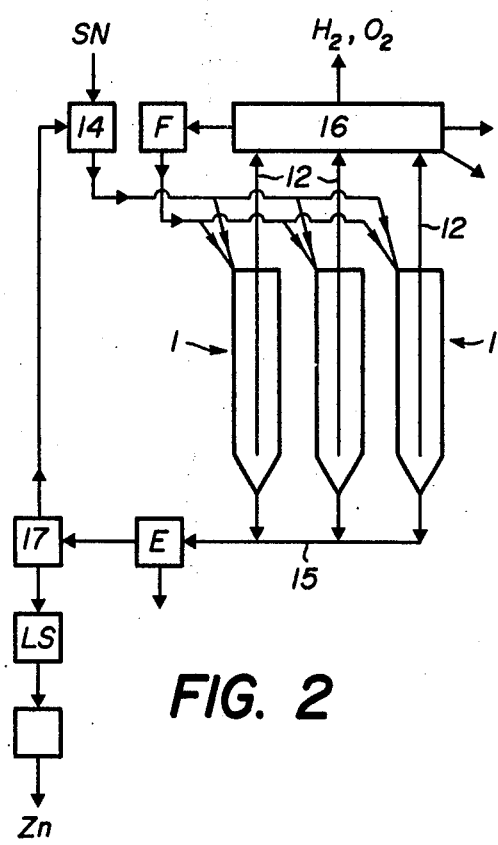
FIG. 1 is a diagrammatic vertical section through an electrolysis cell for effecting the invention.

FIG. 1 shows a cylindrical electrolysis cell 1 comprising a cathodic collector 2 of generally tubular form disposed coaxially about a tubular anodic collector 3 and separated from this latter by a closed helical channel 4.

The channel 4 constitutes the electrolysis chamber of the cell 1 and is bounded by an electrically insulating distance piece 5 of annular helical shape, the turns of which have a vertical L cross-section. A radial part of each turn 5' of the distance piece 5 engages in a sealed manner with the external surface of the anodic collector 2, and the upper face of this radial part is inclined downwards radially outwards.

The upper radial face of each turn 5' is connected progressively to a longitudinal part having an internal inclined surface to form an obtuse rounded angle with said radial face, and carrying the cathodic collector 2 formed from a continuous helical strip.

The cathodic collector 2, formed from a conducting material which is inert towards the electrolysis reacting system, is connected to a negative terminal by means not shown. The collector 2 may for example be in the form of an aluminium strip of thickness between 0.2 mm. and 5 mm. (according to the dimensions of the helical channel). As a modification, it may be formed from stainless steel or titanium.

FIG. 1 also shows that the cell 1 is provided with a feed pipe 6 disposed laterally at the upper end of the cell 1 so as to open tangentially into the inlet of the helical channel 4. The pipe 6 comprises a terminal part with a right rectangular cross-section corresponding approximately to that of the channel 4, so as to prevent any abrupt change in the flow regime at the inlet to the channel 4.

The cell 1 comprises a housing 11 formed preferably of an electrically insulating material, housing the distance piece 5 which bounds the closed helical channel 4 extending over the larger part of the height of the cell 1.

The closed channel 4 opens into the lower part of the cell 1 constituted by an extension of the cylindrical housing 7, followed by a frustoconical base 8 in such a manner that together they constitute a hydrocyclone which opens at one end into a lower axial outlet pipe 9 provided with an outlet valve 10 to control the removal of the granules, which have increased in size during electrolysis. The internal surface of the base 8 may be formed from an electrically conducting material and connected to the negative terminal so as to give cathodic protection to the granules if necessary, in order to prevent the granules re-dissolving in the electrolysis solution before removal from the cell 1.

The tubular anodic collector 3 is formed from a tube of electrically conducting material of good chemical resistance to the electrolysis solution, for example either pure lead, or an alloy of lead-silver (1%), lead-calcium or lead-antimony, or platinised titanium (coated with a conducting oxide such as ruthenium oxide) or graphite.

The anodic collector 3 also comprises radial degassing holes 11 each disposed just below each radial turn and connecting the upper part of each turn of the helical channel 4 to the interior of the tubular anodic collector 3, so as to enable the gases ($O_2$ and $H_2$) formed during electrolysis to be continuously evacuated.

The tubular anodic collector 3 is open at its lower end and at the same time constitutes an evacuation duct which opens at its upper end into an upper lateral outlet pipe 12 serving to evacuate said gases from the electrolyte.

FIG. 1 also shows that the anodic collector 3 is connected to the positive terminal of the cell by suitable connection means shown only very diagrammatically in the Figure.

The anodic collector may also be disposed in such a manner as to be able to be turned about its longitudinal axis to allow scraping of its external surface, e.g. to remove any deposit, by way of the inner edge of each radial turn of the distance piece 5, this edge being provided with one or more scraping members.

An axial sheath 13 (FIG. 1) may be connected to a cooling circuit (not shown) to cool the solution, in particular in the case of copper electrolysis.

As a modification, this sheath 13 may be porous or perforated, and connected to a source of gas (not shown) to enable a gas (for example air) to be introduced in order to enrich the gaseous phase contained in the emerging liquid-gas mixture to bring the partial pressures of the gases in the mixture below their explosive limit.

The solution circulating within the cell may also be kept at a constant temperature by suitable cooling means, not shown on the drawing. These means may for example comprise a cooling jacket surrounding the cell. The cooling means could also be associated with the circuit for feeding or recycling the electrolyte solution.

The radial turns of the helical partition 5 separate the cathodic collector 2 from the anodic collector by a predetermined distance which is relatively small in relation to the diameter of the collectors.

This distance between electrodes, which determines the radial width of the helical channel 4 constituting the electrolysis chamber, may generally lie between a lower limit of the order of 0.8 cm and an upper limit of the order of 3 cm for collectors having a diameter of 10 to 50 cm, for example.

It should be noted that this distance between electrodes should be reduced as much as possible in all cases, so as to ensure minimal ohmic drop, while at the same time providing helical flow under the conditions necessary to effect electrolysis under the best conditions, to be discussed hereinafter.

Thus the lower limit of this distance will be determined on the one hand by hydrodynamic considerations and on the other hand by constructional considerations. An increase in this distance beyond said lower limit can therefore be envisaged for various reasons, e.g. to increase the flow rate or reduce the liquid speed, but this distance must nevertheless be kept very limited so that the electricity consumption during electrolysis does not become prohibitive.

The cell heretofore described is fed (from a tank not shown in FIG. 1) with a suspension of metal granules in the solution containing the dissolved metal to be deposited by electrolysis. The granules on which the metal is to be deposited also generally consist of the metal to be deposited, except where the apparatus is used to coat spheres of one metal with a layer of another metal, or for example for copper plating graphite spheres.

A cell such as that described and shown in FIG. 1 may for example have the following dimensions:
 external diameter ($\phi_{ext}$) 10 to 50 cm;
 total height (H) 150 to 350 cm;
 distance between cathode and anode 0.8 to 3 cm.

Figure 2:
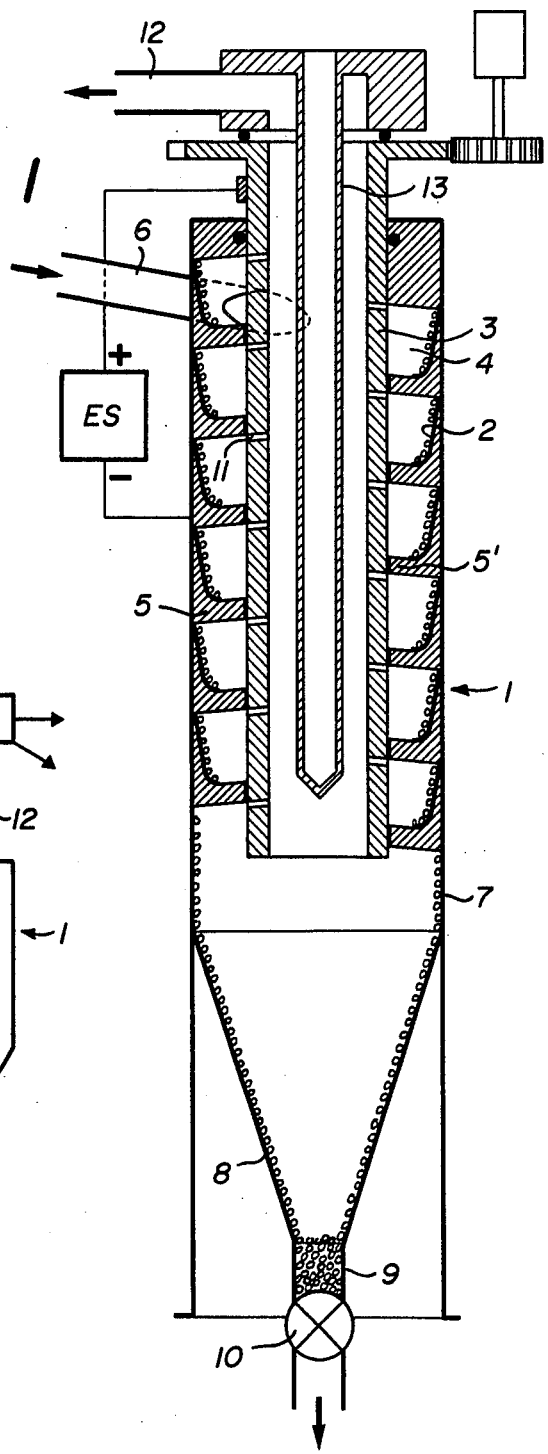
FIG. 2 is a diagram showing an electrolysis installation comprising several cells in accordance with FIG. 1.

The diagram of FIG. 2 shows three cells 1 of the type described connected in parallel to feed and discharge circuits and designed to electrolyse zinc.

Zinc granules are fed in suspension in a neutral solution (SN, FIG. 2) from a tank 14, this suspension being mixed in a volumetric ratio of 1:3 with the acid solution from the electrolyser. This mixing is carried out just before the inlet (pipe 6) to each cell to give the electrolyte solution containing the suspended granules. This selection circulates from the top to the bottom by making a helical movement, in order to effect electrolysis to deposit metal on the granules, as will be described in detail hereinafter.

The granules thus enlarged are then removed through the pipe 9 and valve 10, are collected in a common discharge channel 15 kept under an atmosphere of inert gas, drained (E) and sorted by appropriate means 17, from which a fraction having the required particle size distribution for electrolysis is recycled to the feed tank 14. The fraction of granules not recycled is washed and stabilised (LS, FIG. 2) in an organic medium, then fed into a furnace F to be melted in order to cast ingots.

The acid solution discharged through the outlet pipes 12 of the cells is also recycled by way of a second tank 16 in which the gases ($O_2$ and $H_2$) evolved during electrolysis and entrained by the solution leaving the cells are separated. Part of the acid solution from the tank 16 is then mixed after filtration (F, FIG. 2) with the suspension from the tank 14, a further part being fed to a lixiviation station together with the solution from the draining operation E. The tank 16 is also provided with means for removing fine particles which have decanted in the tank.

The method of operation of the described electrolysis cell is as follows. The suspension enters tangentially into the cell through the feed pipe 6 and undergoes a rapid rotational movement as soon as it enters the helical channel, so that the suspended zinc granules are subjected by centrifugal action to a radial force in the direction of the cathodic collector 2.

The speed of circulation of the suspension, dependent on the radius of curvature of the helical channel, and the granule size are chosen such that a centrifugal force can be produced which is sufficiently high for the granules to be very rapidly propelled against the cathodic surface and kept in contact with this surface by centrifugal force, and to form in this manner a thin mobile layer of granules uniformly covering said surface (see FIG. 1) and moving along said surface by entrainment by the solution circulating in the channel 4. As the granules fed into the cell 1 with the electrolyte solution are kept in electrical contact with the cathodic surface 2 for a considerable part of their time of residence in said cell, the thin mobile layer obtained by centrifugal action in the helical channel 4 enables an electrolytic deposit to be formed on all the granules with a high Faraday efficiency.

This prolonged electrical contact of the granules leads to several advantages:

(i) Considerable increase in the active cathodic surface presented by the granules at each moment for forming the electrolytic deposit, while ensuring good mass transfer from the solution to the granules of the thin mobile bed, because of the rapid solution circulation.

(ii) Relatively small ohmic drop and over-voltage at the collectors, which may be situated a very short distance from each other without it being necessary to use a diaphragm to separate them to avoid short circuits and re-dissolving of the granules, these being disadvantages which can result from contact between the granules and the anodic collector.

(iii) The metal is prevented from dissolving (or re-dissolving) while ensuring its almost continuous electrical contact with the cathode.

(iv) Facility to form a uniform and compact deposit on all granules of the mobile layer because of their movement along the cathodic surface.

The example given hereinafter illustrates the invention in the form of a cell such as described heretofore with reference to FIGS. 1 and 2.

EXAMPLE

Zinc is electrolytically deposited in a cell such as that described heretofore and having the following dimensions:
 external cell diameter $\phi ex$: 14 cm
 inlet dimensions (pipe 6): 4 × 2 cm
 granule outlet diameter (pipe 9): 3 cm (corresponding to the maximum aperture of the diaphragm valve 10)
 distance between electrodes: 2 cm
 pitch of helical channel 4: 5.2 cm
 diameter of cathodic surface 2: 10.5 cm
 axial height of channel 4: 200 cm
 height of outlet cyclone ($h_2$): 30 cm
 angle $\alpha$ of the conical base: 20°.

The zinc is deposited on spherical zinc granules of nearly uniform initial average size, this size being 0.5 mm before electrolysis in this case.

The zinc granules fed initially to the electrolysis installation (FIG. 2) may be formed from zinc balls pulverised after cryogenic treatment. The granules fed to each electrolysis cell are then subjected to sorting to ensure that their size extends over a relatively restricted range about the aforesaid average size.

The granules which have not reached the final required size in the cell are recycled, as is the acid solution leaving the cell, this being degassed and filtered before recycling.

The cell is fed as follows:

Zinc granules of an average size of 0.5 mm are suspended, to an extent of 60 kg of zinc per 100 liters of solution, in a neutral solution of zinc sulphate containing 120 g of dissolved zinc per liter, together with impurities (in particular dissolved Mn).

An acid solution containing 50 g of dissolved zinc per liter and 150 g of free sulphuric acid is fed to the cell inlet and mixed with said suspension to the extent of one part by volume of suspension to three parts of acid solution.

Thus a "diluted" suspension is obtained at the cell inlet, of the following approximate composition:
 150 g of zinc granules per liter;
 65 g of dissolved zinc per liter; and
 80 g of free sulphuric acid per liter.

This suspension is continuously fed through the pipe 6 into the cell 1, through which at the same time a current of 1000 A at about 3.8 volts is passed between the collectors 2 and 3 to effect electrolysis.

The suspended zinc granules are energetically propelled on tangential entry into the helical channel 4 by centrifugal action due to the rotation of the liquid circulating along said channel, so that they separate from the liquid and cover the cathodic surface 6. They are then kept in contact with this surface by centrifugal force and move along it by entrainment due to the circulation of the solution along the channel 4. Thus during electrolysis the zinc is deposited on the surface of the zinc granules which are kept in electrical contact with the cathodic surface 3. The granules move along this cathodic surface as they grow, the granules which have grown by electrolysis and which reach the outlet to the channel 4 are then separated by the hydrocyclone at the bottom of the column and are discharged through the lower outlet pipe 9, while the solution is discharged through the upper outlet pipe 12.

The current of 1000 A passed through the cell enables 1.1 kg of zinc to be deposited per hour.

Assuming a maximum consumption rate of 20 g of zinc per liter per hour, the minimum flow rate corresponding to this consumption rate will be 1100/20 = 55 liters per hour.

In order to obtain a centrifugal force sufficient to ensure formation of the thin mobile layer of granules moving along the cathodic surface, a much higher flow rate is chosen depending in particular on the size of the helical channel, the size of granules and the properties of the solution.

Under the circumstances, the feed flow could be of the order of 3000 liters per hour.

The invention may be effected under operating conditions and with a cell arrangement and structure modified in relation to those heretofore described.

Thus for example any appropriate partitioning means may be used instead of the described distance piece 5, such as to obtain a helical configuration for the channel 4 defining both the path for the solution and granules through the electrolysis enclosure and the relative arrangement of the current collectors. Such partitioning means could be a spiral forming an integral part of the insulating housing for the cell and manufactured together with this latter, for example by moulding or machining.

Moreover, the cell housing may be manufactured in two semicylindrical halves to enable the cathodic collector to be provided on their internal faces, for example in the form of a lining, the two halves then being assembled together with said spiral to define the helical channel with the aid of the tubular anodic collector.

Furthermore, the anodic collector may be formed from a conducting spiral wound facing the cathodic collector on an insulating tubular support, which can also constitute a support for said spiral defining the helical channel.

In addition, the cathodic and anodic surfaces may be disposed opposite each other in any other manner than that described, to form any appropriate angle to the winding axis of the helical channel, providing the centrifugal force enables the mobile bed of granules moving along the cathodic surface to be formed.

The same result (mobile layer on the cathodic surface) could also be obtained by disposing the channel defining the electrolysis enclosure in the form of one or more spirals each wound in a single plane.

We claim:

1. A process for electro-depositing a metal on conducting granules having a predetermined average size, which comprises the steps of:
   a. placing said granules in suspension in an electrolytic solution containing the dissolved metal to be deposited;
   b. introducing the resulting suspension tangentially into an inlet end of a closed helical channel wound about an axis of rotation and provided with two current collectors disposed coaxially at a predetermined radial distance apart and facing each other so that they longitudinally define two opposing sides of the helical channel;
   c. respectively connecting said two collectors to the terminals of a current source such that the collector situated closest to said axis of rotation is connected to the positive terminal of the source to constitute the anodic collector, and the collector situated farthest from said axis is connected to the negative terminal to consistute the cathodic collector presenting an internal surface for electrical contact with said granules:
   d. selecting the average size of said granules the average winding radius of said helical channel and the speed of introduction of said suspension therein as a function of each other and of the properties of said solution in such manner as to create at said inlet a rotating movement capable of producing a centrifugal force sufficient to energetically propel said granules against said cathodic surface so as to bring them very rapidly into contact with said surface to cover said surface with a mobile layer of said granules, which is carried along said surface and kept in contact there with by the bulk of said solution circulating from said inlet end of the helical channel to an outlet disposed at the opposite end thereof;
   e. causing an electric current to pass between said collectors to effect electrolysis while said solution circulates between the inlet and outlet ends of said helical channel, such that said dissolved metal is deposited electrolytically on the granules which are kept in contact with said cathodic surface while forming said mobile layer thereon, and that said granules are thereby progressively enlarged while being carried along said surface, and
   f. separating the solution from the enlarged granules leaving the helical channel so as to remove them separately from each other.

2. A process for the electrolytic production of a metal on electrically conductive particles disposed within an electrolysis cell for contact with a fixed cathode of the cell and with an electrolyte solution containing the dissolved metal to be deposited on said particles, said method comprising the steps of:
   (a) providing a powder suspension consisting of conducting powder particles of a predetermined average size suspended in said solution;
   (b) providing an electrolysis cell in the form of a closed helical channel which comprises an inlet and an outlet at respective opposite ends thereof, and a fixed outer cathode arranged coaxially around a fixed inner anode and radially spaced therefrom at a predetermined short distance defining the width of said channel;
   (c) continuously feeding said powder suspension tangentially into the inlet of said channel at a predetermined rate;
   (d) selecting said average size of the powder particles, the winding radius of said helical channel and the feed rate of the suspension as a function of each other and of the properties of said solution, in such a manner that the powder suspension fed tangentially into said inlet of the channel undergoes a rotating movement producing a centrifugal force sufficient to rapidly drive said suspended powder particles onto the surface of said outer cathode to form a mobile layer of said particles which cover said cathode surface, are maintained in contact therewith and are carried along said surface by the bulk of said solution circulating from the inlet to the outlet of said closed helical channel;

(e) passing an electrolysis current between said outer cathode and inner anode to effect electrolytic deposition of said dissolved metal on the powder particles forming said mobile layer kept in contact with said outer cathode surface due to centrifugal force, whereby said powder particles of said layer are progressively enlarged while being carried along said cathode surface by the bulk of said solution circulating to the outlet of said helical channel; and (f) separating the enlarged granules by centrifugal force from said solution leaving the outlet of said helical channel.

3. A process according to claim 2, wherein the width of said closed helical channel defined between said outer cathode and said inner anode is at most equal to three centimeters.

4. The process claimed in claim 2 wherein the particles are composed of the said metal.

5. An electrolysis apparatus for electro-depositing a metal on conducting granules, comprising:
   a. at least one closed annular helical channel constituting an electrolysis enclosure defined by a cathodic collector disposed coaxially about a tubular anodic collector and separated from the latter by an electrically insulating helical distance piece;
   b. a tangential inlet disposed at one end of said helical channel for the introduction of a suspension of said granules in an electrolysis liquid and adapted to give the suspension a rotating movement capable of subjecting said granules to a centrifugal force sufficient to energetically propel them outwards in such a manner that they form a mobile layer which moves along the surface of the cathodic collector to the outlet of the helical channel which outlet is situated at the opposite end of said channel;
   c. a centrifugal separation device provided with an inlet connected to said outlet of the helical channel, and two axial outlets of which a first outlet is connected to the interior of the tubular anodic collector to enable the solution separated by said device to be withdrawn, and of which the second outlet serves for removing the granules coated with the deposited metal; and
   d. narrow transverse apertures provided in said tubular anodic collector to constitute degassing passages connecting the helical channel, at various points distributed over its length, to the interior of the anodic collector.

6. An electrolysis apparatus for electrodepositing a metal on conducting granules, comprising:
   a. at least one closed channel having a plurality of coaxial turns and constituting an electrolysis enclosure defined between a cathodic collector and an anodic collector disposed radially within and electrically insulated from the cathodic collector,
   b. a tangential inlet at one end of the said channel for the introduction of a suspension of said granules in an electrolysis liquid and adapted to give the suspension a rotating movement capable of subjecting the granules to a centrifugal force sufficient to propel them energetically outwards in such a manner that in operation they form a mobile layer which moves along the surface of the cathode collector to the outlet of the channel which outlet is at the opposite end of the channel,
   c. a separation device connected to the said outlet for separating the granules from the liquid.

* * * * *

Dedication 4,090,927.—*Jean-Marie Fresnel*, Haut-Thoiry, France; *Antonin Kulhanek*, Le Lignon and *Augusto Porta*, Geneva, Switzerland. PROCESS FOR ELECTRO-DEPOSITING A METAL ON CONDUCTING GRANULES. Patent dated May 23, 1978. Dedication filed Mar. 26, 1984, by the assignee, *Battelle Memorial Institute*.

Hereby dedicates to the People of the United States the entire remaining term of said patent.

[*Official Gazette May 29, 1984.*]